July 28, 1925.
H. A. STEELE
1,547,240
METHOD AND APPARATUS FOR TESTING OR OPERATING OIL WELLS
Filed Feb. 5, 1924   3 Sheets-Sheet 1
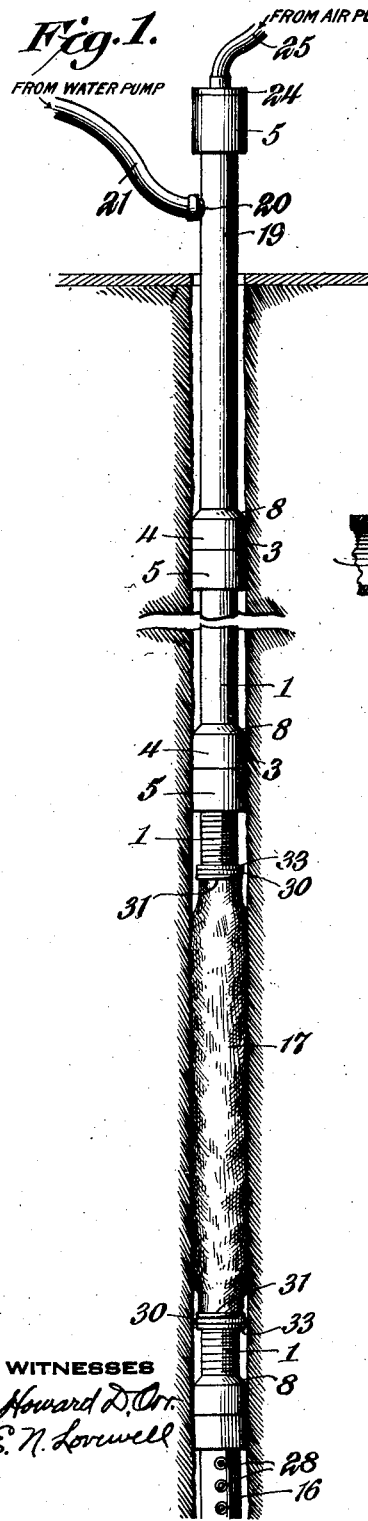
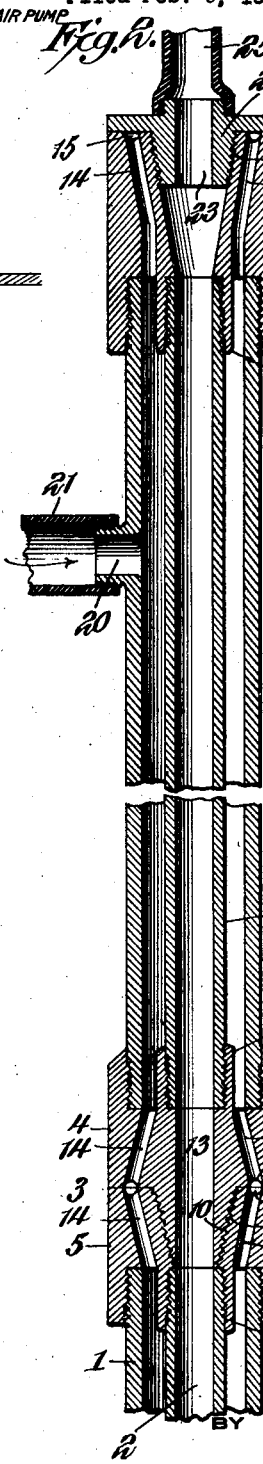
INVENTOR,
Hampton A. Steele,
ATTORNEY July 28, 1925.
H. A. STEELE
1,547,240
METHOD AND APPARATUS FOR TESTING OR OPERATING OIL WELLS
Filed Feb. 5, 1924    3 Sheets-Sheet 2
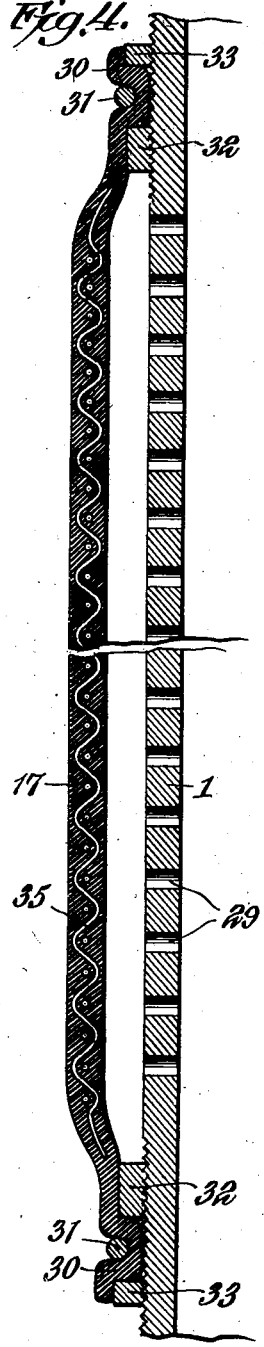
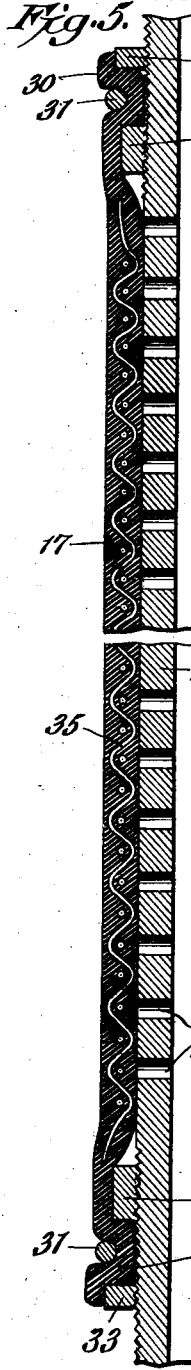
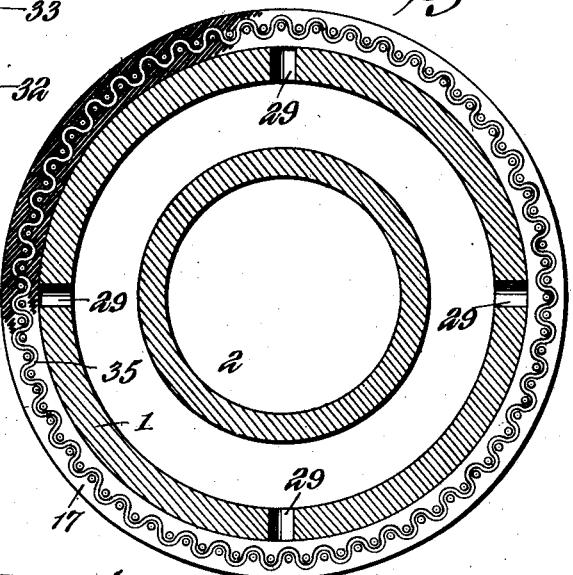
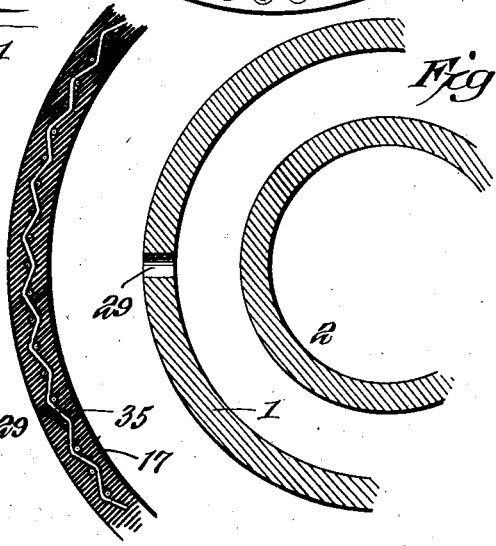
Hampton A. Steele, INVENTOR,
BY
ATTORNEY
WITNESSES July 28, 1925.
H. A. STEELE
1,547,240
METHOD AND APPARATUS FOR TESTING OR OPERATING OIL WELLS
Filed Feb. 5, 1924   3 Sheets-Sheet 3
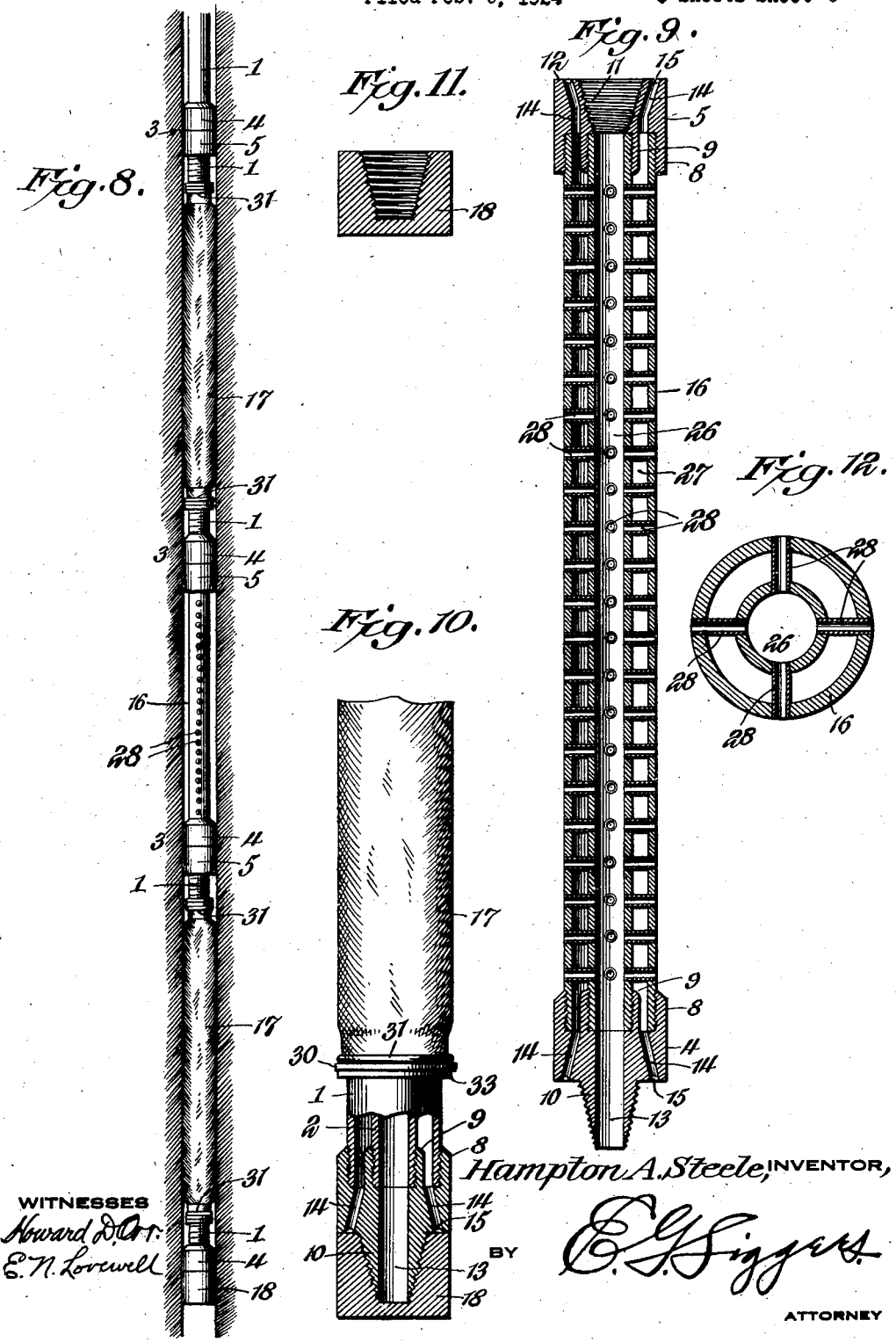
Hampton A. Steele, INVENTOR,
WITNESSES
BY
ATTORNEY Patented July 28, 1925.

1,547,240

UNITED STATES PATENT OFFICE.

HAMPTON A. STEELE, OF LAWTON, OKLAHOMA.

METHOD AND APPARATUS FOR TESTING OR OPERATING OIL WELLS.

Application filed February 5, 1924. Serial No. 690,807.

*To all whom it may concern:*

Be it known that I, HAMPTON A. STEELE, a citizen of the United States, residing at Lawton, in the county of Comanche and State of Oklahoma, have invented a new and useful Method and Apparatus for Testing or Operating Oil Wells, of which the following is a specification.

The present invention relates to oil wells, and is primarily intended to be used in connection with improved drilling apparatus disclosed in my co-pending applications, Serial Numbers 690,805 and 690,806, filed of even date herewith. It has particular reference to the determination of the location of oil or gas bearing strata, and to the subsequent operation thereof.

In drilling operations, as at present conducted at considerable depths, there are many factors which may deceive even the most experienced operators, and it frequently happens that prolific strata are penetrated and passed and mudded up without the operator realizing the fact, even when the presence of oil in paying quantities is detected or suspected. It has heretofore been the practice to case in the well before production is begun, and if the location of the oil strata has not been accurately determined or estimated, the production is curtailed or fails altogether.

One of the principal objects of the present invention is to overcome the difficulty, uncertainty and delay occasioned by the present devices employed, by providing an improved method and apparatus, used preferably in connection with the drilling apparatus disclosed in my above mentioned co-pending applications, and adapted to obtain positive indications of the character and extent of the potential oil or gas producing strata.

This improved method of testing includes the use of a new type of cord and rubber packer, which is operated in a novel manner by the use of the duplex string of pipe, arranged in a manner to be hereinafter described.

This method makes it possible to test oil or gas bearing formations, and to determine their exact productivity without the use of a casing, and without the necessity of bailing or swabbing mud and water from the hole. The removal and exclusion of the mud and water is effected by air pressure, in cooperation with the use of the packer above mentioned. This method also makes it possible to locate and test lost sands in a well, which have been drilled through unknowingly. Their exact depth and thickness may be learned, and their productivity determined without bailing or casing.

The present invention may also be used with great advantage in connection with the production of oil or gas after the well has been completed, and cased in.

A further advantage of the invention is to make it feasible to obtain production simultaneously from several separate and distinct sands in the same wall even though there is water between them, whereas heretofore, it has been necessary to have a separate well for each oil sand.

The invention consists further in numerous details of construction and combinations of elements, which will be more specifically pointed out in connection with the accompanying drawings, which illustrate one way in which the invention may be carried out.

In the drawings:

Figure 1 is a side elevation of the invention in operative position.

Figure 2 is an enlarged diametric section through the upper portion thereof.

Fig. 3 is a diametric section through the portion of the pipe line to which the packer is attached.

Figure 4 is an enlarged detail sectional view through one side of the packer, showing the same expanded.

Figure 5 is a similar view showing the packer before it is expanded.

Figure 6 is a horizontal section through the portion of the pipe line surrounded by the packer.

Figure 7 is a fragmentary view of the parts shown in Figure 6, but with the packer expanded.

Figure 8 is a section of the well, showing the use of the invention with two packers.

Figure 9 is a diametric sectional view through a section of duplex pipe of special construction through which the oil flows.

Figure 10 is a detail view showing the lower end of the pipe line.

Figure 11 is a detail sectional view of the cap used for closing the lower end of the pipe line.

Figure 12 is a horizontal section taken through the perforated section of duplex pipe shown in Figure 9.

In carrying out my invention, as illustrated in the drawings, a duplex pipe line is used, consisting of outer and inner concentric pipe sections 1 and 2 connected end to end by tool joints 3, which are of novel construction, and form the subject matter of my co-pending application, Serial No. 690,805, above referred to. Each tool joint consists of a male member 4, and a female member 5. Each member has internally threaded flanges 8 and 9, which engage the adjacent threaded ends of the next sections of the duplex pipe line. The members 4 and 5 have mating portions 10 and 11 provided with interengaging tapered threads, and interengaging shoulders 12. The member 4 is provided with a central bore 13, which connects the inner pipe sections, and each of the members 4 and 5 have annular series of passageways 14, which lead from the annular spaces between the adjacent pipe sections, and the abutting shoulders 12 are provided with continuous annular grooves 15, which register with each other so as to connect the several passageways 14 of the respective joint sections, and consequently form a continuous passageway regardless of the relative positions of the respective sections 4 and 5. It will be understood that the pipe sections 1 and 2, of each length of duplex pipe, are cut to the same length, so as to fit when joined together.

The pipe sections 1 and 2 and the tool joints 3 are the same as are used in the drilling operation, which is described in my co-pending application, Serial No. 690,806. Upon completion of the drilling operation, or at any time during the drilling operation, when it is deemed advisable to test for oil or gas, the pipe line is withdrawn from the hole, and the cutting tool, as well as the grief joint used in operating the same, are removed. The pipe line is then again lowered into the well, but this time includes in addition to the pipe sections 1 and 2, one or more specially constructed sections 16, and one or more packers 17. (Figures 8 and 9.) The specially constructed sections 16 are so arranged that when the pipe line is in position, they will be located opposite the strata to be tested, and a packer 17 is located above, and if necessary below each of the sections 16 to shut off the water therefrom. The lower end of the pipe line is provided with a cap 18 provided with tapered threads, adapted to engage the threads of the lowermost member 4, as shown in Figure 10, and to close the central bore 13, as well as the passageways 14. At the upper end of the pipe line, in place of the grief joint, a pipe length 19 is used having its outer section provided with a laterally extending nipple 20 adapted to be connected with a hose 21, which leads from a rotary water pump. A tool joint member 5 is connected to the upper end of the pipe length 19, and a nipple 22 is threaded into its upper end. This nipple is of special construction, and provided with a central bore 23 adapted to aline with the adjacent pipe section 2, and has a peripheral flange 24 adapted to form a closure for the passageways 14. A hose 25, leading from an air pump, or other source of air pressure, is connected to the nipple 22.

The specially constructed pipe section 16 (Figure 9) is provided with a central bore 26 adapted to form a continuation of the inner pipes 2, and between its inner and outer walls has a space 27 forming a continuation of the passageway between the pipes 1 and 2, through the passageways 14 in the tool joints. Communication is provided between the bore 26 and the sides of the well by means of nipples 28 which traverse the space 27, but do not materially interfere with the circulation of water therethrough.

The pipe lengths, which carry the packers 17, are constructed the same as the pipe lengths used for the line, except that the outer section is provided with numerous perforations 29, as shown in Figures 3, 4 and 5, which afford free communication between the outer passageway and the interior of the packer. Each packer 17 extends substantially throughout the length of the pipe length to which it is attached, and each end 30 thereof is secured underneath a hoop 31 and between two rings or nuts 32 and 33, which are threaded onto the end of the pipe length, and which may be adjusted to clamp and lock the packer to the pipe. The end of the packer may be provided with a bead extending over the outer edge of the ring 33.

Each packer is specially manufactured from elastic rubber, through which run longitudinal and transverse cords 35, which, when the rubber is in contracted or normal position, extend sinuously throughout the fabric, as illustrated in Figures 5 and 6. The diameter of the packer is such that when in normal position, it will hug the outside of the pipe to which it is attached. When pressure is applied to its inner surface by fluid introduced through the perforations 29, it will expand against the wall of the well and form a liquid tight connection therewith, the cords 35 being of sufficient length to permit this, as shown in Figures 4 and 7. Thus, the cords 35 provide reinforcement for the rubber, positively limiting its expansion, and prevent it from bursting in case the pressure becomes excessive, while at the same time they permit sufficient expansion for the purpose designed. As soon as the water pump is disconnected from the outer pipe the contractile strength of the rubber will return the packer to normal position and permit withdrawal from the well.

In carrying out the operation of testing according to my improved method, the cutting tool and grief joint are disconnected from the pipe line, as above explained, and the latter is again inserted in the well with the specially constructed section 16, and one or more packers 17. The section 16 is located opposite the strata to be tested, and a packer 17 secured above the same to shut it off from the upper strata containing water. If the test is made at the bottom of the well, no lower packer will be needed. If, however, the test is made on strata located at a considerable distance from the bottom of the well, it will usually be necessary to employ a second packer. After the pipe line has been placed in position for testing, air is pumped into the inner line of pipe 2, until all water, drillings and mud have been forced out. These will pass out through the passageways 28 in the section 16, and will be forced upwardly, and will generally overflow around the pipe at the surface. When the pipe has been cleared, water is pumped in through the hose 21 and downwardly between the outer and inner sections 1 and 2, and will pass outwardly through the perforations 29 and inflate the packer or packers 17, against the wall of the well and provide a liquid tight connection and effectually prevent any return flow of the fluid, which has been forced outwardly and upwardly by the air under pressure. When the packers have been sufficiently inflated, the air hose 25 is disconnected so that the oil or gas may flow freely to the surface from the section being tested, the flow taking place through the section 16 by way of the nipples 28 and up the inner pipe 2. Thus a positive determination of the rate of flow of oil or gas, if any, may be made at once. It is not necessary to go to the expense of casing in until it is positively determined whether such a procedure would be profitable. In fact, the apparatus may be left in the hole, and satisfactory production may be obtained without any casing at all.

The above described method may be repeated as often as is necessary to test all strata, where there is any possibility of production. Oil sands, which have been drilled through without the operator suspecting their nature, may be easily located by this method. In case a productive sand is found and located, it is not necessary to stop drilling operations, but they may be continued until two, three or more separate sands have been passed through. Then the above process may be carried out to test the several sands successively, or they may be tested simultaneously, using as many of the specially constructed sections 16 as there are different sands, and using a packer 17 above and below each of the sections 16.

The same method may be used for production after the wells have been cased in. For this purpose, the ordinary inner and outer well casing is used except that the lower portion which passes through the productive sands, is constituted as above described, with specially constructed sections 16 opposite the productive sands and packers secured to the outer sections above and below the same, these sections being perforated to permit the packers to be inflated. Thus, production may be obtained simultaneously from all of the sands.

While I have described in detail the several steps of my improved method and the structure of the apparatus by means of which it may be carried out, it is to be understood that this is merely for the purpose of illustration, and that many variations thereof may be devised without departing from the salient features of the invention as expressed in the claims.

What is claimed is:

1. The method of testing oil wells, which consists in introducing a string of drill pipe into the well in proximity to the strata to be tested, expelling the fluid from said pipe by means of air pressure, then shutting off said fluid from the strata to be tested by means of one of more packers, the latter being inflated by hydraulic means, and then discontinuing the air pressure to permit the well to flow.

2. The method of testing oil wells, which consists in introducing a duplex string of inner and outer pipe into the well, expelling the fluid from the inner pipe by means of air under pressure, then shutting off said fluid adjacent the strata to be tested by means of a packer inflated by hydraulic pressure introduced through the outer pipe, and then discontinuing the air pressure to permit the well to flow.

3. The method of causing a flow of oil from a well, which consists in introducing a string of duplex inner and outer pipe into the well and bringing the inner pipe into communication with the oil sand, locating an expansible packer around the outer pipe between the oil sand and any water bearing strata which may have been bored through, expelling the fluid from the inner pipe and up around the outer pipe by means of air pressure introduced through the upper end of the inner pipe, then inflating the packer, and then discontinuing the air pressure to permit the well to flow.

4. The method of causing a flow of oil from a well containing several separate oil sands, which consists in introducing a string of duplex inner and outer pipe into the well and bringing the interior of the inner pipe into direct communication with the several oil sands, locating expansible packers around the outer pipe above and below each oil sand, then expelling the fluid from the inner pipe by means of air pressure introduced through the upper end of the inner pipe, then inflating said packers by hydraulic means to make a liquid tight connection with the well, and then discontinuing the air pressure to permit the well to flow.

5. The method of testing oil wells, which consists in introducing a string of pipes into the well in proximity to the strata to be tested, said pipes containing an inner and an outer conduit, then introducing air pressure into the inner conduit to expel the fluid therein, then closing communication between the said strata and expelled fluid, and finally discontinuing the air pressure to permit the oil to flow from said strata.

6. The method of testing oil wells, which consists in introducing a string of pipes into the well in proximity to the strata to be tested, said pipes containing an inner and an outer conduit, then introducing air pressure into the inner conduit to expel the fluid therein, providing expansible packers in communication with the outer conduit, introducing water pressure into the outer conduit and causing the packers to expand so as to shut off the expelled fluid from the strata to be tested, and finally discontinuing the air pressure to permit the oil to flow from said strata.

7. In an apparatus for oil wells, the combination with a string of pipes, each containing an inner conduit and an outer conduit, one section of said pipes having its inner conduit provided with passageways leading outwardly therefrom and affording communication with the strata of the well to be tested, means for introducing air pressure to the inner conduit to expel the fluid therefrom through said passageways into the well, one or more expansible packers provided on the pipe adjacent said passageways, passageways between the outer conduit and said packer or packers, and means for introducing water pressure to the outer conduit to expand the packer or packers so as to form a liquid tight connection with the well and close communication between the strata being tested and the rest of the well.

8. In an apparatus for testing oil wells the combination with a string of pipes, each containing an inner conduit and an outer conduit, a section of said pipes having the inner conduit provided with passageways leading outwardly therefrom through the outer conduit and affording communication with the strata of the oil well to be tested, means for introducing air pressure to the inner conduit to expel the liquid therein through said passageways into the well, and means provided on said pipes above said section to form a liquid tight connection with the well and close communication between the strata being tested and the rest of the well.

9. In an apparatus for oil wells, the combination of an inner pipe and an outer pipe made up of sections, one section of the inner pipe having passageways leading therefrom through the surrounding outer pipe and affording communication between the interior of the inner pipe and the sides of the well, but leaving sufficient room for free circulation of water through the outer pipe, and an expansible packer secured around the outer pipe above said last mentioned section.

10. In an apparatus for oil wells, the combination of an inner pipe and an outer pipe made up of sections, one section of the inner pipe having passageways leading therefrom through the surrounding outer pipe and affording communication between the interior of the inner pipe and the sides of the well, but leaving sufficient room for free circulation of water through the outer pipe, a pair of expansible packers secured around the outer pipe, respectively above and below said last mentioned section and in communication with the outer pipe, means for expelling the fluid from the inner pipe, and means for subsequently inflating said packers from the outer pipe.

11. In an apparatus for oil wells, the combination of an inner pipe and an outer pipe made up of sections, one section of the inner pipe having passageways leading therefrom through the surrounding outer pipe and affording communication between the interior of the inner pipe and the sides of the well, but leaving sufficient room for free circulation of water through the outer pipe, an elastic packer secured around the outer pipe above said last mentioned section, the outer pipe underneath the packer having perforations, so that the packer may be inflated by water pressure introduced through said outer pipe.

12. In an apparatus for oil wells, the combination of an inner pipe and an outer pipe made up of sections, a means for closing the lower ends of both pipes, one section of the inner pipe having passageways leading therefrom through the surrounding outer pipe and affording communications between the interior of the inner pipe and the sides of the well, but leaving sufficient room for free circulation of water through the outer pipe, a pair of elastic packers of cord and rubber secured around the outer pipe, respectively above and below said last mentioned section, and perforations in the outer pipe underneath the packers, so that they may be inflated by water pressure introduced through said outer pipe.

13. In an apparatus for oil wells, the combination of an inner pipe and an outer pipe made up of sections, means for closing the lower ends of both pipes, one section of the inner pipe having passageways affording communication with the sides of the well, but not materially interrupting the circulation of water through the outer pipe, an expansible packer secured around the outer pipe above said last mentioned section, perforations through the outer pipe beneath said packer, a nipple secured to the upper end of the inner pipe and having an integral flange closing the upper end of the outer pipe, means for connecting said nipple to a source of air pressure, and a branch connected to the upper section of the outer pipe and adapted to be connected to a source of water pressure to expand the packer.

14. A duplex pipe length for use in a well, said pipe length having inner and outer pipe sections, means for coupling the same in a duplex pipe line to allow longitudinal circulation through both sections, there being no communication whatever between the inner and outer passageways, and means affording a transverse circulation between the inner pipe sections and the strata surrounding the outer section without material interference with the longitudinal circulation through the outer section.

15. A duplex pipe length for use in a well, said pipe length having inner and outer concentric pipe sections, coupling members adapted to be connected to the ends thereof and having passageways to permit circulation longitudinally through both sections of pipe, the inner section being entirely unobstructed throughout its length so as to permit the use of a pump, and transverse passageways providing communication between the interior of the inner pipe section and the strata surrounding the outer pipe section.

16. A duplex pipe length for use in a well and having inner and outer concentric pipe sections, coupling members adapted to be connected to the ends thereof and having passageways to permit circulation longitudinally through both sections of pipe, and transverse passageways providing communication between the interior of the inner pipe section and the strata surrounding the outer pipe section, said passageways consisting of nipples which lead from the inner pipe through the outer pipe, said nipples being spaced from each other.

17. A duplex pipe length for use in a well, having inner and outer pipe sections, means for coupling the same in a duplex pipe line to allow longitudinal circulation through the respective sections, there being no communication whatever between the inner and outer passageways, said outer section having perforations therein, an expansible packer secured at its ends to said outer section and covering said perforations, and means affording communication between the passageway through the inner pipe section and the surrounding strata at a different level than the packer and without material interference with the longitudinal circulation through the outer section.

18. A duplex pipe length for use in a well, having inner and outer pipe sections, means for coupling the same in a duplex pipe line to allow longitudinal circulation through the respective sections, there being no communication whatever between the inner and outer passageways, an expansible covering surrounding the outer pipe section and secured at its ends thereto, said outer pipe section having perforations providing communication from the passageway between the inner and outer pipes to the inside of the packer.

19. A duplex pipe length for use in a well, having inner and outer pipe sections, means for coupling the same in a duplex pipe line to allow longitudinal circulation through the respective sections, there being no communication whatever between the inner and outer passageways, an expansible packer surrounding the outer section with its ends secured thereto, said outer section having perforations between the ends of the packer, said packer being composed of elastice rubber with individual spaced cords arranged longitudinally and circumferentially and embedded therein, each of said cords being sufficiently sinuous so that the packer may be expanded into any shape to conform to the shape of the cavity surrounding the pipe.

20. In an oil well apparatus, the combination of a length of duplex pipe with inner and outer sections, the outer section having lateral perforations, a packer composed of elastic material and substantially cylindrical in shape when in normal position, means for securing the packer around the pipe so as to enclose the perforations, and means adapted to be connected to a pump for introducing fluid through the outer pipe and perforations to expand the packer against the earthen sides of the well, the inner pipe being in free communication with the space surrounding the outer pipe but at a different stratum from that occupied by the packer, the side of the packer and its contractile strength being such that when the pump is inoperative the packer will contract against the pipe and permit withdrawal of the same from the well.

In testimony, that I claim the foregoing as my own, I have hereto affixed my signature.

HAMPTON A. STEELE.